(12) United States Patent
Holmes (10) Patent No.: US 6,292,775 B1
(45) Date of Patent: Sep. 18, 2001

(54) SPEECH PROCESSING SYSTEM USING FORMAT ANALYSIS

(75) Inventor: John N Holmes, Malvern (GB)

(73) Assignee: The Secretary of State for Defence in Her Britannic Majesty's Government of the United Kingdom of Great Britain and Northern Ireland, Farnborough (GB)

( * ) Notice: Subject to any disclaimer, the term of this patent is extended or adjusted under 35 U.S.C. 154(b) by 0 days.

(21) Appl. No.: 09/242,532

(22) PCT Filed: Oct. 13, 1997

(86) PCT No.: PCT/GB97/02818

§ 371 Date: Feb. 18, 1999

§ 102(e) Date: Feb. 18, 1999

(87) PCT Pub. No.: WO98/22937

PCT Pub. Date: May 28, 1998

(30) Foreign Application Priority Data

Nov. 18, 1996 (DE) .................................................. 9623892

(51) Int. Cl.[7] .................................................. G10L 15/14
(52) U.S. Cl. .......................... 704/209; 704/256; 704/268
(58) Field of Search .................................... 704/200, 205, 704/207, 261, 268, 206, 208, 201, 209, 258, 251, 255, 256

(56) References Cited

U.S. PATENT DOCUMENTS

| | | | |
|---|---|---|---|
| 4,087,632 | * 5/1978 | Hafer | 704/251 |
| 4,783,802 | 11/1988 | Takebayashi et al. | 704/243 |
| 4,817,155 | 3/1989 | Briar et al. | 704/203 |
| 5,146,539 | 9/1992 | Doddington et al. | 704/241 |

OTHER PUBLICATIONS

Proceedings of the 1998 IEEE International Conference on Acoustics, Speech and Signal Processing.Holmes et al., "On the robust incorporation of formant features into hidden Markov models for automatic speech recognition" pp1–4, vol. 1, May 1998.*

1994 IEEE International Conference on Acoustics, Speech, and Signal Processing, 1994. ICAASP–94. Yehia et al., Determination of human vocal–tract dynamic geometry from formant trajectories using spatial and temporal Fourier analysis pp I–477–I480. vol., May 1998.*

Hunt, "Delayed decisions in speech recognition—The case of formants" Pattern Recognition Letters, vol. 6, No. 2, Jul. 1987, pp. 121–137.

* cited by examiner

*Primary Examiner*—Richemond Dorvil
(74) *Attorney, Agent, or Firm*—Nixon & Vanderhye P.C.

(57) ABSTRACT

A speech processing system (10) incorporates an analogue to digital converter (16) to digitize input speech signals for Fourier transformation to produce short-term spectral cross-sections. These cross-sections are compared with one hundred and fifty reference patterns in a store (34), the patterns having respective stored sets of formant frequencies assigned thereto by a human expert. Six stored patterns most closely matching each input cross-section are selected for further processing by dynamic programming, which indicates the pattern which is a best match to the input cross-section by using frequency-scale warping to achieve alignment. The stores formant frequencies of the best matching pattern are modified by the frequency warping, and the results are used as formant frequency estimates for the input cross-section. The frequencies are further refined on the basis of the shape of the input cross-section near to the chosen formants. Formant amplitudes are produced from input cross-section amplitudes at estimated formant frequencies. The formant frequencies and amplitudes are used with a computer (25) to provide speech indications or with a Hidden Markov Model word matcher (24) to provide word recognition.

53 Claims, 4 Drawing Sheets

SPEECH PROCESSING SYSTEM USING FORMAT ANALYSIS

BACKGROUND OF THE INVENTION

1. Field of the Invention

This invention relates to a speech processing system, and more particularly to such a system which makes use of the resonant modes of the human vocal tract associated with speech sounds, these being known as the formant frequencies.

2. Discussion of Prior Art

Formant frequencies usually appear as peaks in the short-term spectrum of speech signals. For many years it has been recognised that they are closely related to the phonetic significance of the associated speech sounds. This relationship means that there are many applications in automatic processing of speech signals for which an effective method of formant frequency measurement would be useful, such as:

(a) Formant vocoders, ie devices for coding low-bit-rate speech transmissions;

(b) Visual display of formant frequency variation with time, to aid the deaf to interpret speech, or to assist in their speech training;

(c) Automatic authentication of identity from an individual's speech; and (d) Speech signal analysis for input to an automatic speech recognition system.

The requirements of these applications could be met by determining the formant frequencies from a succession of spectral cross-sections at regular time intervals. In addition, it is also useful to determine the associated formant amplitudes because the phonetic quality of speech sounds depends on both. For some sounds (vowels in particular) the relative formant amplitudes are determined largely by the pattern of formant frequencies. However, the relative amplitudes for most consonants will be very different from those typical of vowels, and even for vowels they will vary with vocal effort and from speaker to speaker.

Unfortunately, in spite of the usefulness of formant information, automatic formant-frequency measurement is notoriously difficult. The primary cause of this difficulty arises because speech processing involves analysis of sounds of short duration to produce short-term spectral cross-section, but the spectral peaks which define the formants are not necessarily clearly apparent in such a cross-section. The acoustic theory of speech production shows that under ideal conditions the human vocal tract has a series of resonant modes at an average frequency spacing of about 1 kHz, the actual frequencies of the resonances being determined by the precise positions of the jaw, tongue, lips and other articulators at any particular time. The fact that the formants are inherently associated with acoustic resonances of the human vocal system means that their frequencies will normally change smoothly with time as the articulatory organs move to produce different speech sounds.

The influence of the formant frequencies in determining the phonetic properties of speech almost entirely relates to only the lowest three of these resonances (usually referred to as F1, F2 and F3), and resonances above the third are of little importance. In fact resonances above F4 are often not detectable in speech signals because of bandwidth limitation. In the case of telephone bandwidth signals even F4 is often not present in the available signal.

There are many reasons why the elegant theory about speech production often does not yield a clear picture of the theoretical formants during real speech sounds. First, the theory treats the response of the vocal tract, and takes no account of the spectral properties of the sound sources which excite the tract. The main sound sources are air flow between the vibrating vocal folds, and turbulent noise caused by flow through a constriction in the vocal tract. Most of the time these sources have a spectral structure that is not likely to obscure the resonant pattern of the vocal tract response. The spectral trends of these sources as a function of frequency are either fairly flat (in the case of turbulent noise) or have a general decrease in intensity as frequency increases (in the case of flow between the vocal folds). However, in the latter case, particularly for some speakers, there will be occasions where the generally smooth spectral trend will be disturbed at some frequencies, sometimes with minor spectral peaks, but more usually with pronounced dips in the spectrum. If such a dip coincides with a vocal tract resonance, the expected spectral peak of that formant may be almost completely obscured.

The second reason for the difficulty of identifying formant peaks, particularly during some consonant sounds, is that there can be a severe constriction of the vocal tract at some intermediate point so that it is acoustically almost completely separated into two substantially independent sections. For these types of speech sound, the sound source is normally caused by air turbulence generated at the constriction. The sound radiated from the mouth in these circumstances is then influenced mainly by the resonant structure of the tract forward from the constriction, and the formants associated with the back cavity (notably F1) are so weakly excited that they are often not apparent at all in the radiated speech spectrum. In these cases F1 has no perceptual significance, but it is advantageous to associate other resonances with appropriate higher formantnumbers from continuity considerations. The behaviour of formant frequencies as a function of time is described in terms of formant trajectories; each formant trajectory is a series of successive values of a respective individual formant frequency such as F1 as a function of time. There is therefore a set of three formant trajectories for the formant frequencies F1, F2 F3. Continuity considerations imply continuity of formant trajectories across vowel/consonant boundaries.

Turbulence-excited consonant sounds have a further difficulty for formant analysis because during these sounds the glottis (the space between the vocal folds, in the larynx) is open wide, so causing more damping of the formant resonances because of coupling into the sub-glottal system (the bronchi and lungs).

The third difficulty of formant analysis applies specifically to high-pitched speakers for which the frequency of vibration of the vocal folds may be fairly high, perhaps 400 Hz or even higher. This high frequency yields harmonics for which the spacing may be larger than the spectral bandwidth of the formant resonances. Thus a formant peak may lie between two harmonics and therefore not be obvious, and spectral peaks caused by harmonics may be mistaken for formants.

The fourth difficulty of formant analysis applies to nasalized sounds. The basic speech production theory does not apply to these sounds, because it is based on the response of an unbranched acoustic tube. In the presence of nasalization (either nasal consonants or nasalized vowels) the soft palate is lowered, and the nasal cavities become coupled with the vocal tract. The acoustic system then has a side branch, which introduces a complicated set of additional resonances and antiresonances into the response of the system. In these cases the simple description of a speech signal in terms of the three most important formants no longer strictly applies. However, some of the resonances of the vocal tract with nasal coupling are more prominent than others, and it is often possible to trace temporal continuity of these resonances into adjacent periods when nasalization is absent. It can therefore still be useful to describe nasal sounds also in terms of F1, F2 and F3. Although the three-formant concept is still useful for nasal sounds, the more complicated acoustic system usually causes the resonances to be less prominent than in non-nasal sounds. It is thus often extremely difficult to decide, when looking at a spectral cross-section, what the formant frequencies should be.

Determination of the formant frequencies of speech sounds, particularly as features to use in automatic speech recognition, has been described by M. J. Hunt in "Delayed decisions in speech recognition—the case of formants", Pattern Recognition Letters 6, 1987, pp. 121–137. Here initial speech signal processing was by means of linear prediction analysis (LPA). A description of linear prediction techniques applied to speech signals is given, for example, in J. D. Markel and A. H. Gray, "Linear Prediction of Speech", Berlin, Springer, 1976.

Linear prediction is a technique which can model the human vocal tract as a linear filter with a small number of poles but no zeros in its transfer function. The poles can occur in complex conjugate pairs or they can be real. For the conjugate pairs, each such pair represents a resonator. If certain very idealised assumptions about the vocal tract and its excitation source are correct, it can be shown that these resonant poles correspond accurately to the formants of the vocal tract.

For those occasions when the formants of speech are well defined and well separated in frequency, LPA gives a reasonable description of the formant frequencies, at least for the lowest three formants. However, as discussed previously, some or all of the formants are often not well defined in the short-term spectrum of the signal. In these cases LPA will normally give at least one resonance corresponding to each clear peak in the spectrum, but some other poles (either heavily damped resonances or single real poles) will be set to improve the modelling of the general spectral shape. Pairs of formants that are fairly close in frequency will sometimes be modelled correctly by two resonators, but will often be modelled by only one, with the extra poles so released being used more effectively to model some other aspects of spectral shape. For sounds in which some resonances are of much lower intensity than others, LPA will rarely assign poles to the weaker resonances.

Where the speech power is extremely low at a formant frequency (e.g. F1 in a typical [s] sound, LPA analysis would not assign a formant to the true lowest vocal tract resonance, so correct labelling would not be possible. Similar considerations apply to formant frequencies derived from a spectral cross-section obtained by other means, such as from a smoothed Fourier transform.

The problem of obtaining useful formant data is illustrated in the case of a vocoder, which is a typical application of the use of formant frequencies. It is a system for coding speech signals for low-bit-rate transmission or storage; it depends on separating the general shape of the short-term spectrum of input sound from fine spectral detail, which is determined by the type of sound source exciting the speaker's vocal system at any given time. A number of different types of vocoder are known in the prior art, and they describe the short term spectral shape in different ways, see for example J. L. Flanagan, "Speech Analysis Synthesis and Perception", Springer-Verlag, 1972. Vocal tract resonances mostly change smoothly with time, and they are dominant in determining the phonetic properties of speech signals. Thus the transmission parameters of formant vocoders offer the potential for good speech intelligibility at lower bit rates than other vocoders such as channel vocoders and linear prediction vocoders. However, it has proved difficult to develop an acceptable formant vocoder in the absence of reliable production of formant data.

SUMMARY OF THE INVENTION

It is an object of the invention to provide a speech processing system which employs formant data.

The present invention provides a speech signal processing system including:
a) spectral processing means for producing spectral cross-sections of input speech signals;
b) storing means for storing comparison spectral cross-sections and respective formant frequencies associated therewith; and
c) comparing means for matching comparison spectral cross-sections with input speech signal spectral cross-sections and for providing formant frequencies derived from those associated with a comparison spectral cross-section in response to a match between that cross-section and an input speech signal spectral cross-section.

The invention provides the advantage that formant frequencies are derived for comparison spectral cross-sections prior to processing, and can therefore be obtained by processes which are not practicable in real time; measurement of formant frequencies is then reduced to a matching process.

The formant frequencies associated with comparison spectral cross-sections may be assigned thereto by automated analysis of speech spectral cross-sections; alternatively they may be assigned by a human expert.

In a preferred embodiment, the comparing means incorporates means for selecting a respective sub-set of comparison spectral cross-sections for matching with each input speech signal spectral cross-section, the sub-set being those comparison spectral cross-sections which exhibit greater similarity to the respective input speech signal spectral cross-section than other stored but non-selected comparison spectral cross-sections when assessed on the basis of an error metric. This enables a simplified matching procedure to be used to select the sub-set, which reduces the computation associated with the matching process. The comparing means preferably also incorporates frequency scale warping means for warping cross-sections to produce matching between comparison spectral cross-sections and input speech signal spectral cross-sections. Such warping reduces the number of comparison spectral cross-sections required to be stored, because each stored cross-section can be warped to fit a number of input speech signal cross-sections.

The comparing means is preferably arranged to provide formant frequencies for an input speech signal spectral cross-section derived from those associated with a comparison spectral cross-section after transformation in accordance with the warping required to match the comparison spectral cross-section to the input speech signal spectral cross-section.

The warping means may be arranged to implement:
(a) a warping function with a slope in the range 0.5 to 2,
(b) a maximum frequency shift not exceeding ±375 Hz, and
(c) maximum frequency shift values in respect of a first formant frequency range comprising ±125 Hz below 500 Hz and ±250 Hz above 500 Hz but not above 1000 Hz.

The system of the invention preferably includes means for determining formant amplitudes from the spectral cross-sections of input speech signals and the formant frequencies associated with comparison spectral cross-sections matched therewith. It may also include means for determining rates of change of formant frequencies and formant amplitudes for input speech signal spectral cross-sections from the formant frequencies and formant amplitudes of preceding and succeeding input speech signal spectral cross-sections. Such rates of change are referred to hereinafter as delta frequencies and delta amplitudes respectively.

The invention may include means for refining estimates of formant frequencies on the basis of shapes of respective input spectral cross-sections in the regions of such frequencies; such refining means may also take into account effects attributable to neighbouring formants.

The storing means may be arranged to store at least some comparison spectral cross-sections with two or more alternative sets of formant frequencies associated therewith, together with means for selecting between such alternatives on the basis of formant frequency continuity in the time domain.

In a preferred embodiment, the system of the invention includes means for determining formant amplitudes for input speech signal spectral cross-sections together with speech recognition means responsive to formant frequencies and formant amplitudes, such as Hidden Markov Model word matching means.

In an alternative embodiment, the system of the invention includes means for generating formant frequency and formant amplitude information from input speech signal spectral cross-sections to enable comparison with reference information.

The invention may include means for generating alternatives for formant information and for indicating degrees of confidence in the formant information contained therein.

In the system of the invention, the spectral processing means may be arranged to determine a short-term spectral shape in a time interval of less than 10 ms, and such time intervals may be chosen to correspond to waveform regions having like positioning relative to respective main points of excitation of the vocal tract, such as beginning thereupon.

In a further aspect, the invention provides a method of processing speech comprising:

a) producing spectral cross-sections of input speech signals;

b) storing comparison spectral cross-sections and respective formant frequencies associated therewith; and c) matching comparison spectral cross-sections with input speech signal spectral cross-sections and providing formant frequencies derived from those associated with a comparison spectral cross-section in response to a match between that cross-section and an input speech signal spectral cross-section.

BRIEF DESCRIPTION OF THE DRAWINGS

In order that the invention might be more fully understood, embodiments thereof will now be described, by way of example only, with reference to the accompanying drawings, in which.

DETAILED DESCRIPTION OF PREFERRED EMBODIMENTS

Figure 1:
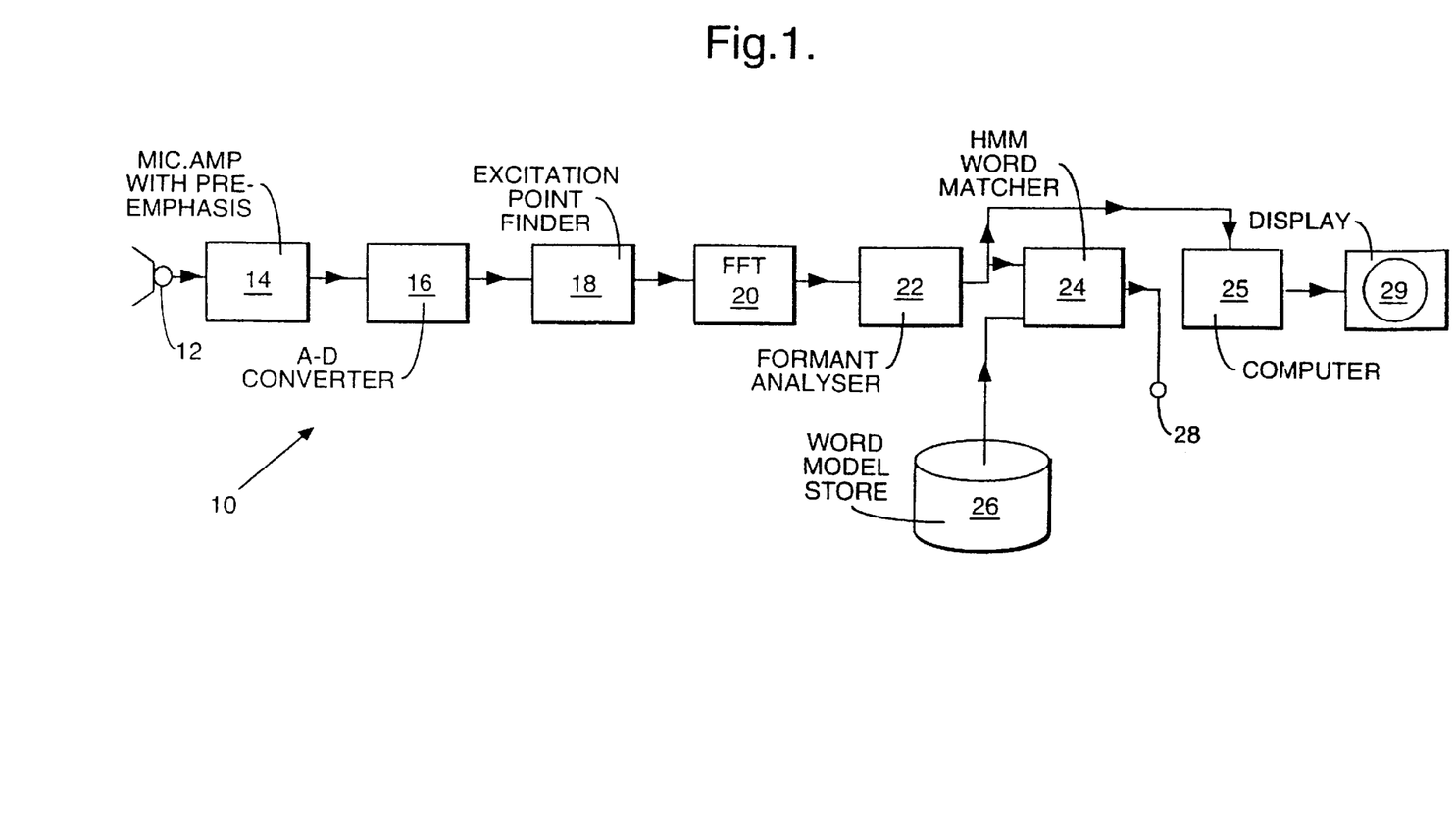
FIG. 1 is a schematic block diagram of a speech processing system of the invention.

Referring to FIG. 1, a speech processing system of the invention is indicated generally by 10. The system 10 incorporates a microphone 12 connected to a frequency selective pre-emphasis amplifier 14. Output from the amplifier 14 passes to an analogue-to-digital converter (ADC) 16 and thence to an excitation point finder 18. The excitation point finder 18 provides input to a fast Fourier transformer (FFT) 20 which in turn is connected to a formant analyser 22. The formant analyser 22 provides input to a Hidden Markov Model (HMM) word matcher 24 and a computer 25. The Hidden Markov Model (HMM) word matcher 24 receives a second input from a word model store 26 and provides an output signal at an output 28. The computer 25 is connected to a visual display unit (VDU) 29.

The mode of operation of the system 10 will be outlined in brief in the first instance, and a more detailed discussion will be given later. The system 10 generates the short-term spectral shape or cross-section of a voice signal at regular intervals of 10 ms. Speech analysis data produced at such regular intervals are referred to as frames. The frame interval of 10 ms is particularly suitable for describing the speech spectrum changes in sufficient time detail, but shorter or longer intervals are also acceptable. In the system 10 the speech waveform samples used to produce a spectral cross-section for each frame are chosen to include the periods of higher power immediately after the main points of excitation of the vocal tract caused by vibrating vocal folds, or by air turbulence when the vocal folds are not vibrating. The alternative of measuring the average spectrum over a longer time window would in general give a less accurate representation of the human vocal tract properties. The term short-term spectrum means a spectrum determined in a period shorter than the whole duration of the signal. Many speech processing applications determine short-term spectra in intervals of 50 ms or more. Use of the excitation point finder 18 permits generation of useful spectra in 8 ms or less. In fact, although a 64-point (8 ms) FFT is used, an input signal of this length is too long for formant analysis of high pitched voices, and in this case samples at the end of the input window are set to zero. In the present example, a short-term spectrum is determined in a time interval of 6.25 ms.

Human voice input is applied to the microphone 12, which generates an analogue voice signal for input to the pre-emphasis amplifier 14. The amplifier gain varies with frequency to give preferential gain to higher frequencies in the voice signal to make the average spectral power distribution more uniform. The amplifier output is converted to a digital signal by the ADC 16, which produces signal samples at a frequency of 8000 samples per second; ie the sampling frequency is 8 kHz, which gives a bandwidth of 4 kHz from Nyquist considerations.

A spectral cross section is generated for every 10 ms of input signal (ie for every 80 samples). The samples representing the speech waveform are fed to the excitation point finder 18, which detects the point within each 10 ms interval where the average power measured over the sequence of twenty following samples is a maximum, indicating a main point of excitation of the vocal tract. For any frame where the maximum average power so derived is more than 3 dB below the maximum average powers derived from the previous frame and from the following frame, the excitation point derived from the current frame is replaced by the excitation point from whichever of the two neighbouring frames has the lower power. This process is included mainly to deal with cases where the vocal folds are vibrating with a frequency of less than 100 Hz, so that there is a possibility of there being no vocal fold excitation occurring within the 10 ms interval. If the vocal fold frequency were to be below 50 Hz the above scheme could still fail to find a genuine excitation point, but such occasions do not need special treatment because they occur very infrequently in normal speech. The excitation point finder 18 passes each waveform region beginning eight samples before an excitation point to the FFT 20 which implements the fast Fourier transform algorithm. The FFT 20 computes successive sixty-four point Fourier transforms (spectral cross-sections) over respective time intervals or windows each of length 8 ms and containing sixty-four signal samples.

Before the computation of the FFT the samples are multiplied by a windowing function as follows: for the first sixteen samples the function increases linearly from zero to one over the sixteen sample interval; for the next thirty-four samples the function is held constant at unity; for the next sixteen samples the function decreases linearly from one to zero; for the remaining fourteen samples the function is held constant at zero. Thus only fifty samples of the input waveform affect the FFT computation, representing a signal length of 6.25 ms. The gradual increase and decrease of the window function at its two ends has the effect of preventing major disturbances to the resultant spectrum shape as a result of large discontinuities of input waveform shape. Other smooth windowing functions could be used for this purpose. Starting the FFT eight samples before the derived excitation point has the effect that the excitation point is positioned half-way up the initial slope of the window function. A sixty-four point Fourier transform would produce thirty-three outputs at respective frequencies 125 n Hz (n=0, 1, . . . 32), but those at 0 Hz and 4 kHz are not very useful. Each transform is therefore used to provide thirty-one frequency components at non-zero frequencies which are equally spaced at intervals of 125 Hz over the 4 kHz bandwidth.

The excitation point finder 18 overcomes the problem that an 8 ms window in the input digitised speech signal is short enough to lie entirely between two excitation points of the human vocal tract. If this were to be the case, the output of the FFT 20 would depend on the exact location of the window with respect to the excitation points. This is an unwanted source of variation between successive short term spectral shapes or cross-sections. Moreover, the speech samples include a region immediately following an excitation point in which power is high compared to other regions; this provides signal-to-noise ratio benefits.

From the Fourier transform data, the formant analyser 22 determines values for the frequencies and amplitudes of the three lowest-frequency formants of the speech signal known as F1, F2 and F3, together with confidence weights associated with those values. It also determines values for delta frequencies and delta amplitudes indicating the rate of change of the formant measurements. As will be described later in more detail, the confidence weights are calculated from the spectral shape and the measured formant frequencies. They have low values for formant frequencies which are associated with low amplitudes or which are located where the spectral curvature is low.

The Word Model Store 26 contains a set of word-level hidden Markov models (HMMs), one for each word in the vocabulary required in the application for which the system 10 is intended. It is not essential to use whole word HMM word matching in this invention, and in some embodiments for speech recognition it may be preferable to use HMMs of sub-word units or even speech recognition techniques using other matching methods, such as artificial neural networks, instead of HMMs. However HMMs are well known, and form the basis of most current speech recognition systems. A HMM is a statistical model and is specified completely by a set of parameters. The parameters are trained automatically using well-established HMM training procedures (such as the Baum-Welch algorithm), in conjunction with a set of training utterances for each word in the vocabulary. In order to obtain HMMs which are consistent with the output of the formant analyser 22, it is necessary to process a set of training utterances through elements 12 to 22 of the system 10 to provide processed data for training the HMM word matcher 24. This enables the system 10 to recognise such utterances.

The HMM word matcher 24 is well understood in the prior art of speech processing. After an unknown utterance indicated by U has been processed through elements 12 to 22 of the system 10, it has become represented by a sequence $y=y_1, \ldots y_t \ldots y_T$ of feature vectors each corresponding to a respective input frame; T is the length of the utterance in terms of the number of frames. The components of each feature vector correspond to the formant frequencies and amplitudes, the delta frequencies and amplitudes and the confidence weights output from the formant analyser 22 in respect of a spectral cross-section input at time t. Feature vectors associated with frames having alternative formant descriptions include such alternatives.

The function of the HMM word matcher 24 is to find the sequence of HMMs M(1),M(2), . . . ,M(N) in the word model store 26 which has the highest statistical probability of having generated the sequence y. This probability is that in the Viterbi sense, which is well known in the prior art of speech recognition. The probability depends on the parameters of the HMM word models, and will also depend on the parameters of any statistical language, such as an N-gram language model, which is incorporated in the HMM word matcher. This again is well known in the prior art. The unknown utterance U is then recognised as the word sequence W(1), W(2), . . . ,W(N), where for n=1 to N W(n) is the word corresponding to the HMM M(n).

The HMM word matcher 24 used in the system 10 differs from prior art equivalents only in the use of confidence weights and alternative formant descriptions, which do not occur in feature vectors for other types of HMM speech recogniser not involving formants as input features. Moreover, the difference relates only to that part of the HMM calculation which is generally known as the emission probability calculation, ie the calculation of the probability that any particular state of a word model M(n) would produce the observed input feature vector. It is usual to express the emission probability as the negative logarithm of the actual probability, hereinafter referred to as NLP. Thus smaller values of NLP correspond to more likely events, and larger values correspond to less likely events. Most HMM speech recognisers perform the emission probability calculation by modelling the statistical properties of the individual features of the feature vectors by parameters of a continuous probability density function (such as a normal distribution, or a mixture of several normal distributions with appropriate mixing coefficients). To simplify the calculations they also regard the variation of the separate features of the feature vector to be statistically independent (ie the feature covariance matrix is assumed to be diagonal). In these circumstances the calculation of NLP for each complete feature vector is the sum of components derived for the individual features independently.

The HMM word matcher 24 uses confidence weights as follows. It multiplies each formant frequency component of NLP by the value of the confidence weight (in the range 0 to 1) for the corresponding formant, before adding the components to produce the total NLP. If any measured formant frequency is very unreliable, this multiplication by the confidence weights has the effect of preventing the matching of any states of the word models from being penalised just because the measured formant frequency is very different from the corresponding formant frequencies specified by the word models. The use of alternative sets of formant frequencies involves calculating NLP for each such set of frequencies (including the use of their confidence weights as described above) then setting the final value of NLP to be the lowest of the separate NLP values so calculated. This has the effect, for each state of each word model M(n), of choosing the set of formant frequencies which is the best match to the formant frequencies specified in the model for that state. Use of confidence weights and alternative formant sets is advantageous as regards word recognition accuracy compared to non-use of these properties. Because this way of using confidence weights and alternative formant sets is not compatible with the Baum-Welch algorithm, they are not used in the training phase of the HMM word matcher 24.

The function of the computer 25 and VDU 29 is to provide the speech processing system 10 with capability to help people with speaking difficulties. It is particularly applicable to the deaf, as it provides visual feedback which indicates the quality and acceptability of a spoken sound. When a deaf person attempts to speak a prearranged sound, the VDU 29 gives a visual representation of that attempt which the person compares with a corresponding target representation.

Initially the VDU 29 displays a picture showing the trajectories of F1, F2 and F3 for the required utterance (as shown for example in FIG. 3 to be described later in more detail). This picture is produced manually in advance, or it might alternatively be the result of processing a good pronunciation of the required utterance through elements 12 to 22 of the system 10 and checking the result manually by inspection. A person is then prompted to speak the required utterance and the resulting speech is processed through elements 12 to 22. The outputs are then displayed, as a function of time, either under the target (ie intended) formant trajectories or superimposed on top of them, so that they can be compared by the person by eye. The formant analyser 22 produces multiple hypotheses and associated confidence weights, and all of the hypotheses are displayed and colour coded according to their individual confidence weights. This has the advantage that if the person produces an acceptable utterance but the formant analyser makes an error, it is likely that one of the alternative hypotheses will indicate the correct formant trajectories and the person will be able to make a judgement based on this knowledge.

Figure 2:
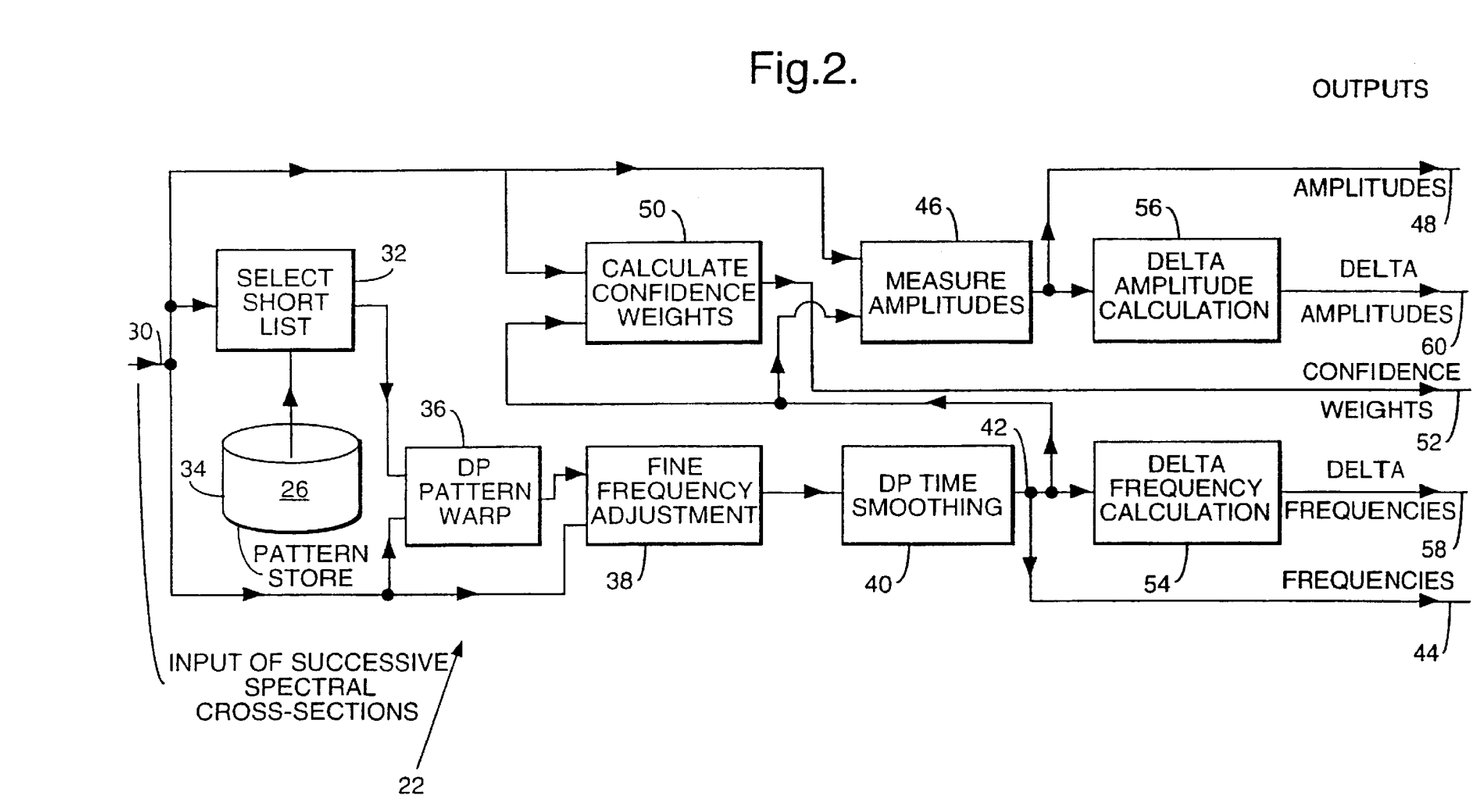
FIG. 2 illustrates in flow diagram form a formant analyser incorporated in the system of FIG. 1.

The formant analyser 22 is shown in more detail in FIG. 2. It consists of a computer programmed to carry out a series of functions, and is illustrated as a flow diagram. The analyser 22 has an input 30 to receive successive Fourier transforms (spectral cross-sections) from the FFT 20. The Fourier transform at any time instant t provides a spectral cross-section in the form of a thirty-one point power spectrum, ie a thirty-one dimensional vector of real numbers $w_t = \{w_{t,1}, w_{t,2} \ldots w_{t,31}\}$, representing frequencies from 125 Hz to 3875 Hz. The dynamic range of the components of this vector is compressed by taking logarithms, so that the output of the FFT 20 at time t is the vector $x_t = \{x_{t,1}, x_{t,2} \ldots x_{t,31}\}$, where $x_{t,i} = \log(w_{t,i})$ and i=1 to 31. The formant analyser 22 compares each power spectrum at 32 with reference patterns retained in a pattern store 34. Before this comparison is implemented, the respective mean value of the relevant cross-section is subtracted from each logarithmic input spectral cross-section and each comparison logarithmic spectral cross-section (reference pattern). By performing this subtraction on spectral cross-sections coded logarithmically, the comparison is only affected by the shapes of the cross-sections and not by their mean values. This counteracts the effect of the loudness of the speech at any instant and the gain of the input system on the result of the comparison process. The store 34 contains one hundred and fifty spectral cross-sections or patterns each associated and stored with one or more respective sets of the first three formant frequencies. The number of patterns could be anything from about one hundred to three hundred, but it has been found that one hundred and fifty is adequate. Each set of formant frequencies has previously been determined by a human expert from inspection of the relevant reference pattern in each case. Alternatively each set may be assigned by automated analysis of speech spectral cross-sections, such as for example cluster analysis using a large set of speech data chosen to cover the set of all possible speech sounds as uniformly as possible.

The stored patterns are chosen to cover the range of sets of formant frequencies which occur in speech. Formants frequencies are stored in complete sets, and confidence weights are not stored. In cases where the spectrum shape is such that it is impossible to be certain which spectral peak should be associated with each of the formants, a small number of alternative sets of formant frequencies are stored in the pattern store 34.

In an ideal system, each input spectral cross-section would be compared, in detail, with each reference pattern or cross-section in the pattern store 34 in order to select a closest match, but this is computationally very onerous. The comparison is therefore done in two parts. In the first part the spectral cross-sections are compared in terms of general aspects of their shape, to produce a short list of cross-sections from the pattern store 34 which are fairly similar to the input cross-section. Only the cross-sections in the short list are then subjected to the computationally demanding detailed matching process.

Dynamic programming (DP) (to be described later in more detail) is employed to assess the similarity of patterns using frequency scale distortion; although it is essentially an efficient method, it still requires a fairly large amount of computation for the following reason. If each pattern is represented by thirty-two points, and a range of ±3 points is allowed (e.g. ±375 Hz for 125 Hz frequency steps), there will be seven alignment possibilities to be assessed for every point of the pattern. With DP path slope constraints to be described later, there will be two possible previous path points to be considered when deciding on each new candidate path point, so there will be of the order of 32×7×2=448 operations to perform in aligning one input spectral cross-section with a stored pattern. This is the reason why it is highly desirable to include pattern short list selection in an implementation of the invention.

Pattern short list selection is implemented as follows. For each reference cross-section or pattern x in the pattern store, and for each input spectral cross-section x, a new vector y is obtained by applying a cosine transform C to x, i.e. y=Cx. A new five dimensional vector f(y) is then obtained by setting $f(y)_i=y_i$ (i=1, . . . 5). This corresponds in physical terms to performing a frequency analysis (i.e. Fourier transformation) of the power spectrum. The spectrum, which is only defined on the positive frequency axis, is assumed to be symmetric about the origin for the purposes of Fourier analysis. Hence the "sine" terms drop out and the Fourier transformation reduces to a cosine transformation. This operation results in a description of the spectrum as a weighted sum of cosine waves. The lower frequency cosine waves provide a description of the overall shape of the power spectrum and are thus suitable for performing a crude comparison of power spectra. In the example, the coefficients corresponding to the five lowest order cosine waves are used.

Preliminary sorting is carried out at 32 by computing the squared Euclidean distance between these five-dimensional representations. Those reference patterns which give the lowest squared Euclidean distances with respect to an input spectral cross-section are then selected for further processing. In the present example, six candidate reference patterns are selected in this way. Experimentally it has been found that if no more than six such patterns are selected, the preliminary selection from one hundred and fifty patterns takes less time than the reduced amount of detailed matching, and normally produces a pattern for which the detailed matching gives a good formant allocation.

The next stage is to undertake a detailed comparison between the input spectral cross-section and the candidate reference patterns. This employs what is known as dynamic programming (DP) to undertake reference pattern warping, and is indicated at 36. Dynamic programming is an established optimisation technique which was derived by Richard Bellman in the 1960s. It states that, for problems which conform to the "principle of optimalityΔ (for example the problem of finding a shortest route between two points), the cost of the cheapest route from point A to B, passing through one of the points $C_1, \ldots C_M$, is the minimum, over m (ie m=1 to M), of the cost of the cheapest route from A to $C_m$ plus the cost of getting from $C_m$ to B. It is implicit in this that the relevant cost of the route can be computed, which is carried out using what is referred to as a DP cost function.

Pattern warping is implemented as follows. Let a reference pattern in the pattern store 34 be represented by $a=a_1, \ldots a_L$ and $b=b_1, \ldots b_L$ is an input spectral cross-section. Let p: {1, . . . L}→{1, . . . L} be a mapping from the ordered set {1, . . . L} into itself subject to the conditions that firstly p(1)=1, secondly p(L)=L, and thirdly p(i)=p(i−1)+k, where k=0, 1 or 2. What this means in physical terms is that, for the purposes of establishing the similarity between any reference pattern a and an input spectral cross-section b, each point in a will be associated with a point in b; this is subject to the conditions that a and b will have coincident initial and final points, and that if $a_i$ is associated or aligned with $b_j$, then $a_{i-1}$ will have been aligned with $b_j$, $b_{j-1}$ or $b_{j-2}$. The mapping p is called a "frequency registration path", and the conditions to which it is subject are called "continuity conditions" on p. It introduces a warping into the frequency scale of the reference pattern.

In the present example the following constraints are introduced: firstly, the slope of the warping function must lie between 0.5 and 2, inclusive; secondly, the maximum frequency shift implemented during warping must not exceed ±375 Hz at any point; and thirdly lower values of this maximum shift are imposed in the frequency range which corresponds to the first formant F1, these being ±125 Hz below 500 Hz and ±250 Hz from 500 to 1000 Hz inclusive.

For the slope of the warping function to lie between 0.5 and 2, a further condition is to be met by the path constraints indicated above to be p(i)=p(i−1)+k (k=0,1,2). The case k=2 allows the local slope of the path to be as large as 2, but the case k=0 would permit smaller values of slope. To ensure that the slope does not fall below 0.5, an extra condition is included of the form: if p(i)=p(i−1) then p(i−1)=p(i−2)+k (k=1 or 2).

The next stage is to calculate what is referred to as the "accumulated distance between a and b along p", which is given by:

$$D(a, b \mid p) = \sum_{i=1}^{L} |a_i - b_{p(i)}|,$$

where |x| is the absolute value of x.

D(a,b|p) represents the sum obtained by adding together the separations between every pair of associated or mapped points in a and b, ie between all pairs of points $a_i$ and $b_{p(i)}$, where $a_i$ represents the point in a associated with $b_{p(i)}$ by virtue of the mapping operation. Intuitively, if D(a,b|p) is small, then the frequency warp defined by the mapping p results in a good match between a and b. A variety of mappings or frequency registration paths are possible within the scope of the continuity conditions referred to above. The "optimal path" is the path p' which minimises D(a,b|p) and the DP-distance between a and b is defined by:

DPDist(a,b)=D(a,b|p')

This optimal path and D(a,b|p) can be computed using Dynamic Programming, as follows. Let D(i,j) denote the accumulated distance along the best partial path of length i such that p(i)=j. Then, subject to the following initial conditions:

D(1,1)=|a_1−b_1| and D(1,j)=∞ (j>1), the principle of optimality applies and:

D(i,j)=min{D(i−1,j−k)+|a_i−b_j|, k=0, 1, 2 }.

Dynamic programming is the process of applying this rule recursively, starting at the point (1,1) and ending at the point (L,L), which correspond to the initial and final points of the reference pattern and the input spectral cross-section.

Then DPDist(a,b)=d(L,L).

If at each point (i,j) the locally optimal decision is recorded, then the optimal path p' can be recovered "backwardsΔ, starting at (L,L) and ending at (1,1).

Instead of the simple absolute value, $|a_i-b_j|$, of the difference between points in the patterns a and b, the DP cost function may take into account other aspects of the spectral cross-section shapes. For example the slope of the spectrum may be included, and empirically determined weighting factors may be used to give more importance to differences of slope than to differences of intensity, and to give more weight to high-intensity regions of the spectrum than to low-intensity regions. It is also possible to add additional costs for parts of the path for which the slope is not equal to 1 (ie k=0 or k=2 in the equation for D(i,j), so that frequency-scale distortion is penalised.

As has been said, the maximum frequency shift during warping is to be ±375 Hz at any point, which is ± three spectrum frequency steps of 125 Hz; for the first formant F1 frequency range, this is to be ±125 Hz below 500 Hz and ±250 Hz from 500 to 1000 Hz, or one and two frequency steps respectively. This means mathematically that the search range is dependent on the value of i. Each index value i in the reference pattern must map onto i−J, . . . i, . . . i+J in the input spectral cross-section, where J=3 for frequencies above 1000 Hz, J=1 for frequencies below 500 Hz and J=2 for frequencies from 500 Hz to 1000 Hz inclusive. Therefore, for each i, the quantity D(i,j) is only computed for i−J≦j≦i+J, where J is determined by i as above. If during this computation a factor D(i−1,j−k) occurs in the minimisation which has not been previously computed because of this rule, then that factor is discounted from the minimisation. Alternatively this can be achieved by replacing the above equation for D(i,j) with the following modified equation:

$$D(i,j)=\min\{D(i-1,j-k)+|a_{i\_bj}|: k=0,1,2 \text{ and } -J-1\leq j-k\leq i+J-1 \text{ where } J=1 \text{ if } i\leq 4, J=2 \text{ if } 4<i\leq 8 \text{ and } J=3 \text{ if } i>8 \}$$

More generally, one can implement any constraints upon the frequency warping path which restrict the scope of the computation, provided that this does not result in a need to employ too many comparison patterns or produce apparent matching between unreasonably dissimilar patterns.

The result of the matching process is to identify the reference cross-section of pattern y from the pattern store 34 which most closely matches the input cross-section $x_t$ at time t (in the sense that DPDist(y,$x_t$) is a minimum over all reference patterns), together with a description of the corresponding optimal frequency registration path p'. The formant frequencies F1, F2 and F3 which a human expert has previously associated with the identified reference pattern y are then used to indicate the equivalents for the input spectral cross-section $x_t$ by putting them through the mapping process p which gave the optimal frequency registration path p; that is to say, for example, if the value of F1 in a reference pattern y occurred at $y_i$, and $y_i$ is mapped on to or associated with $x_{tj}$ at a frequency $f_j$, then $f_j$ is the value allocated to the first formant frequency F1 in $x_t$. The second and third formant frequencies F2 and F3 are obtained in a similar manner. In general, if f is the frequency of formant F in the most closely matching reference pattern y, then the frequency of formant F in pattern $x_t$ is defined to be p(f). The three formant frequencies are output after DP pattern warping at 36.

DP pattern warping may also be used to provide not only the sets of formant frequencies associated with the most closely matching reference pattern from the pattern store 34, but also the formant frequencies for the second and subsequent most closely matching patterns. In this way a number of alternative hypotheses for the formant positions can be obtained.

Figure 3:
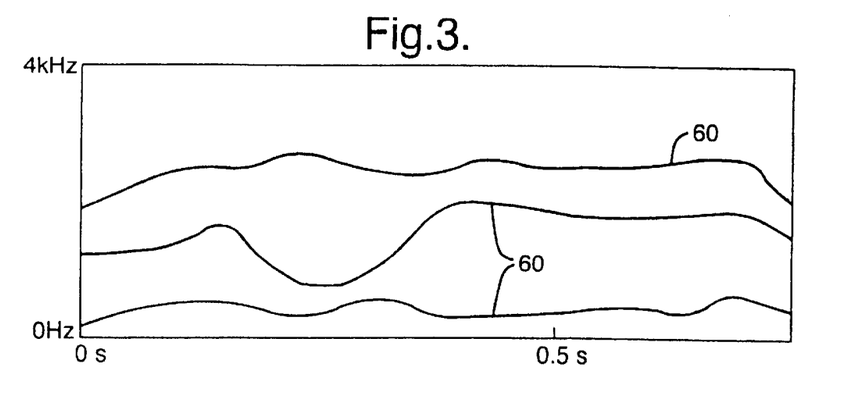
FIG. 3 is a spectrogram showing spectral density of speech as a function of frequency and time.

The procedure for associating formant frequencies with short term speech spectral cross-sections is illustrated graphically in FIGS. 3 to 7. An expert in experimental phonetics interprets a predetermined set of short-term spectrograms of speech utterances and assigns formant frequencies thereto. This provides a set of comparison spectrograms each with associated formant frequencies for retention in the pattern store 34. As shown in FIG. 3, a spectrogram is a graphical display of frequency against time and showing short-term spectral density at any given frequency and time as intensity of marking at the appropriate point on the display. FIG. 3 is in fact a complete spectrogram taken over a time interval approaching one second. However, in assigning formants to the reference patterns stored in the pattern store 34, only short term spectral cross-sections are used, and any plausible alternative labellings of a particular reference pattern are included, even if the formants of the particular speech signal which gave rise to that pattern are known unambiguously.

Lines 60 in the spectrogram shown in FIG. 3 are an interpretation of formant frequencies by a human expert in experimental phonetics. These lines were drawn taking into account not only the short-term spectrum at any point in time, but also the requirement for formant frequencies to change mostly smoothly with time. Given only a single short-term spectral cross-section, interpreting formant frequencies is generally more difficult than is the case for a complete spectrogram.

Figure 4:
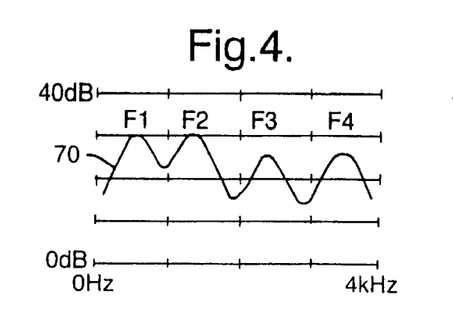
FIG. 4 is a short-term spectral cross-section of a speech signal with clearly defined peaks indicating formant frequencies.

In FIG. 4, a spectral cross-section 70 of a speech signal is shown which has a number of clearly defined peaks, and each of the three lowest frequency peaks falls in the frequency range typical of a respective one of the three lowest-frequency formants. Thus only one sensible formant interpretation of the spectrum shape is possible, and the positions of the formants F1, F2, F3 and F4 are marked.

Figure 5:
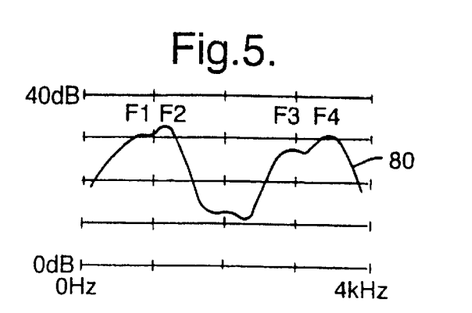
FIG. 5 is a short-term spectral cross-section of a speech signal with formants too close together to be shown as separate peaks.
Figure 6:
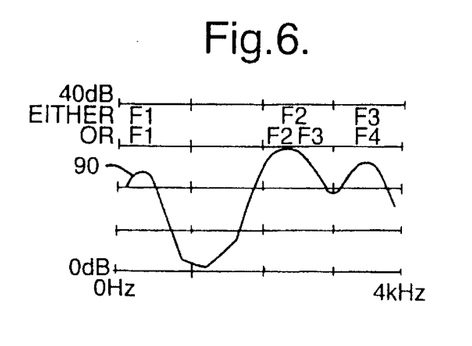
FIG. 6 is a short-term spectral cross-section of a speech signal for which there is uncertainty regarding assignment of formants.

However, for some spectral cross-sections two formants may be associated with a single peak in the spectrum. FIG. 5 shows an example of such a spectral cross-section 80, for which it is still possible for an expert to estimate unambiguous positions for the formants F1, F2, F3 and F4. It is also possible to have more complex situations to resolve. For example, three spectral peaks might be visible at low, medium and high frequency respectively. There might be confidence that the low frequency peaks is F1, but the medium frequency peak might be F2 alone or a combination of F2 and F3 together. The high frequency peak might be F3 or F4. FIG. 6 shows an example of a spectral cross-section 90 where there is doubt over the positions of the formants F2, F3 and F4, the two possibilities being marked as "either" and "or".

Figure 7:
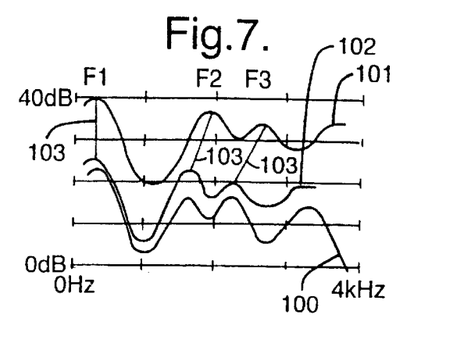
FIG. 7 shows superimposed spectral cross-sections for a speech signal and a stored reference equivalent together with a warped version of the latter to achieve a match to the former.

In FIG. 7, a typical input spectral cross-section is indicated by 100 and a curve 101 indicates a best match thereto, i.e. a stored pattern with its formant frequencies marked. A third curve 102 is the stored pattern after modification by frequency-scale warping. The frequency scale modification produced by dynamic programming is effective in making the stored pattern a good fit to the input cross-section. Lines 103 drawn between curves 101 and 102 indicate the changes made to the pre-stored formant frequencies by frequency scale warping.

The formant frequencies at time t derived from DP pattern warping at 36 are refined by fine frequency adjustment at 38 to obtain more accurate formant frequency estimates, interpolated between the FFT frequency points at 125 Hz spacing. This is carried out as follows, there being two cases. In the first case there is a peak in the input spectral cross-section $x_t$ which is determined as a formant by the pattern warping process, and no other determined formant frequency is close to that peak. Parabolic interpolation is then used to find a frequency between the two spectral points either side of the determined formant frequency, such that the frequency so found is at the highest point of a parabola which passes through the spectral cross-section at the determined formant frequency and at its two neighbouring frequencies, 125 Hz either side of the determined formant frequency. The determined formant frequency is moved to the frequency so found, which will always be within 62.5 Hz of the determined formant frequency.

The second case relates to two determined formant frequencies being closer than 500 Hz, and there is then a peak in the input spectral cross-section $x_t$ which is close to one determined formant frequency and also to another determined formant frequency. This case makes use of a typical formant spectral envelope shape of the kind produced by the FET 20. This typical shape is approximated by a parabola of such a scale that a point on it distant 250 Hz from the frequency of the parabola maximum (simulating a formant) has a magnitude 4 dB lower than that of the parabola maximum. The spectrum that would be generated by two close formants is approximated by superimposing two such parabolas with maxima at the respective desired formant frequencies, and with the magnitudes of their maxima being respective spectral intensities at the nearest points to those frequencies. The process of superimposing the two parabolas involves taking the ordinate (magnitude) at each frequency from whichever parabola has the higher ordinate. Two refined formant frequencies are determined after testing a wide range of frequency combinations in increments of 25 Hz around the region occupied by the two formant frequencies previously determined. The refined formant frequencies are those associated with that pair of parabolas which gives the least absolute value of spectral matching error, accumulated over nine points of the input spectral cross section centred at that previously determined formant frequency which has the higher spectral amplitude.

Thus the result of fine frequency adjustment at 38 in respect of the spectral cross-section $x_t$ input at time t is one or more sets of frequencies for the formants F1, F2 and F3, which are now no longer quantized to multiples of 125 Hz.

At 40 there is indicated an optional but preferable facility relating to DP time smoothing. Although the formant analyser 10 could be used for all applications by taking the finely adjusted formant frequencies derived at 38 from the best-matching comparison spectral cross-section, there may be occasions when the correct formant frequencies correspond to one of the other cross-sections in the short list used in the matching process. There will also be occasions where the best-matching cross-section for a particular frame may give alternative sets of formant frequencies, but a neighbouring frame may give a unique set of frequencies. It is therefore desirable to use the fact that formant frequencies are known to change smoothly with time to select between alternative sets of frequencies derived from all members of the short list to produce formant trajectories that show the minimum discontinuity in time. This selection process is achieved at 40 by another variant of dynamic programming, as follows.

DP time smoothing employs dynamic programming to choose a unique set of formant frequencies at each time t by taking account of the trajectories of formants prior to and subsequent to time t. It uses all available alternative hypothesised formant frequencies, for example by choosing not just the formant frequencies associated with a single best match, but instead those associated with the N best matches from the DP pattern warp stage, for some small value of N.

Let a set of formant frequencies be denoted by a three-dimensional vector f. If at any time t there are N(t) alternative hypotheses for the set of formant frequencies, f(t,1), . . . ,f(t,N(t)), then let D(t,n) denote the 'cost' of the best explanation of the set of trajectories of the formants up to time t such that the frequency set at time t is f(t,n). Then D(t,n) can be defined recursively by the equation $$D(t,n)=\min \{D(t-1,m)+c(f(t-1,m),f(t,n))): m=1, \ldots ,N(t-1)\}.$$

In this recursion c(f,g) is the cost of allowing the formant frequencies to change from set f at time t−1 to set g at time t, and could, for example, be the sum of the absolute values of the frequency differences of pairs of corresponding formants. Alternatively more complicated cost functions may be used, such as by multiplying these absolute values by formant frequency confidence weights calculated by a similar procedure to that to be described later. The recursion is started at time t=0 by setting D(0,n)=0, n=1, . . . ,N(t). For each set f(t,n) a record is kept of the set f(t−1,m) which minimises the equation for D(t,n). The formant frequencies F1, F2 and F3 are each associated with a respective trajectory. There is therefore a set of three formant trajectories for each of the maximum number of possible alternatives which the formant analyser 22 can provide. When fewer alternatives than this maximum are identified at any time, two or more sets of trajectories have converged. To select the best set of formant trajectories which ends at time t using set f(t,n), all possible trajectories can be traced back through time. Unfortunately, at any time t it is not obvious which particular set will turn out to be optimal. This is because events in the future may mean that the best set of trajectories up to time t may ultimately not be the best overall set. Ideally one would wait until some final time T and then trace-back to find the overall optimal trajectory, but for a continuous process such as this there is no final time T.

The solution is to use a technique called partial traceback, which is well known in the prior art. At regular times t all of the sets of trajectories which end at time t are traced back to see if they converge at some past time s. If so, then nothing which happens after s can influence the trajectories up to s. The frequency set f(s,n) for which D(s,n) is minimal is therefore on the optimal set of trajectories, and the trajectories can be traced back from this point and output up to time s. If no time of convergence can be found, then eventually all of the available memory will be used up. Therefore, if at time t a pre-set time has elapsed since the last set of trajectories was output and no point of convergence can be found, then the best set of frequencies at time t is chosen and the optimal set of trajectories to time t are traced back from that point.

For convenience of implementation it is normally best to output trajectory information after a fixed number of frames delay (such as ten frames, i.e. 100 ms), even if a point of convergence is found earlier. The DP process just described essentially gives a single optimum set of trajectories. Sometimes during speech, however, it will not be certain from the information in the signal what the formant frequencies should be at a particular point in time, even after some delay to allow further input to be taken into account; therefore even the DP smoothed trajectories will sometimes be wrong. For this reason a further stage of DP processing may be included to derive a second-best set of trajectories in ambiguous cases. This second-stage DP requires an additional ten frames delay, achieved by delaying its input data by ten frames. The calculation of D(T,n) is exactly the same as given above, except that there is an additional cost function which penalises similarity between the formant set f(t,n) and the formant set at time t specified as being on the best path by the first stage of the DP. The scaling of the similarity penalty is chosen empirically so that trajectories the same as or very close to the optimum set will never be chosen if there is an alternative set with a cost not much higher than the cost of the optimum path chosen in the first stage.

DP time smoothing at 40 produces either one or two sets of formant frequencies at a node 42. These sets are the formant frequencies component of the output of the analyser 22 at 44. The sets are also used at 46 to measure the amplitude associated with each formant frequency at time t. This is done by determining the spectral cross-section amplitude at the nearest spectral cross-section point to each such frequency. The formant amplitudes are output at 48.

Confidence weights are calculated at 50 using the input spectral cross-sections and all the output formant frequencies from the node 42. The calculation is performed as follows. The confidence for a particular formant F (i.e. F1, F2, or F3) is calculated to be a number between 0 and 1. Each spectral cross section is specified as a thirty-one dimensional vector $S=s[1], \ldots ,S[31]$, where one unit on the scale on which the amplitudes of individual vector elements are measured corresponds to 0.25 dB. For any formant F an index f is chosen which indexes to the nearest point in the spectral cross-section (a multiple of 125 Hz) to the frequency of formant F (so that the amplitude of formant F is defined as being S[f]). The first step (STEP 1) in the calculation of the confidence weights is to derive two weights w1 and w2, which is done with the aid of a computer program in the language C as follows:

$$w1=(S[f]-M\_amp+WSHIFT)/WSCALE;$$

$$w2=(S[f]-REFLEV+REF\_WSHIFT)/REF\_WSCALE;$$

The weights w1 and w2 are based on the relative value of the formant amplitude and the maximum amplitude in the current spectral cross-section (w1) and the long-term maximum amplitude (w2). In these expressions, M_amp=max (S[i]), where $i=1, \ldots ,31$, is the maximum spectrum channel amplitude, REFLEV=200 is the maximum spectral channel amplitude to be aimed at when speech is input. WTSHIFT= 100 (25 dB), WTSCALE=4, REF_WTSHIFT=140 (35 dB) and REF_WTSCALE=5 are pre-set constants.

In STEP 2 of the calculation, a single weight w is set to the minimum of w1 and w2, w=min(w1,w2). If w is greater than 16 then it is set equal to 16. In STEP 3, the curvature C of the spectral cross section is calculated at the given formant frequency; the curvature is calculated as:

$$C=2*S[f]-S[lo]-S[hi];$$

where lo=f−2 and hi=f+2 (unless low<1 in which case lo=1 and hi=5, or hi>31, in which case hi=31 and lo=27). If C>32 then C is set equal to 32. If C<8 then C is set equal to 8. In STEP 4, the final confidence weight referred to as "conf" is computed as follows:

$$conf=w*C/512;$$

If conf<0 the conf is set equal to 0.

The confidence weights are output at 52. There are many possible alternatives to the above procedure which could be used to calculate confidence weights.

The DP smoothed formant frequencies and their associated amplitudes are employed at 54 and 56 respectively to calculate delta frequencies and delta amplitudes in relation to the spectral cross-section $x_t$ input at time t. When the DP smoothed output gives alternative sets of formant frequencies, the delta quantities are calculated for each set separately. The delta frequencies associated with cross-section $x_t$ are calculated at 54 from the formant frequencies $F1_{t-1}$, $F2_{t-1}$ and $F3_{t-1}$ associated with $x_{t-1}$ and $F1_{t+1}$, $F2_{t+1}$ and $F3_{t+1}$ associated with $x_{t+1}$. The delta frequencies $\delta F1_t$, $\delta F2_t$ and $\delta F3_t$ are defined by:

$$\delta Fk_t = Fk_{t+J} - Fk_{t-J},$$

where k=1, 2 or 3 and J=1 (i.e. one frame interval).

This defines three values constituting the delta frequencies component of the analyser output at 58 in relation to the spectral cross-section $x_t$ input at time t. It provides for each delta frequency for $x_t$ to be the difference between the associated formant frequency values for the respective immediately succeeding and preceding cross-sections $x_{t+1}$ and $x_{t-1}$; computation of each set of delta frequencies and all other analyser outputs for any input spectral cross-section $x_t$ are therefore delayed to await determination of the formant frequencies for the succeeding cross-section $x_{t+1}$. Each delta frequency is equivalent to the derivative with respect to time of the associated formant frequency, division by time to obtain the derivative being unnecessary because time intervals are constant.

The delta amplitudes associated with cross-section $x_t$ are calculated at 56 from the formant amplitudes $A1_{t-1}$, $A2_{t-1}$ and $A3_{t-1}$ associated with $x_{t-1}$ and $A1_{t+1}$, $A2_{t+1}$ and $A3_{t+1}$ associated with $x_{t+1}$. The delta amplitudes $\delta A1_t$, $\delta A2_t$ and $\delta A3_t$ are defined by:

$$\delta Ak_t = Ak_{t+J} - Ak_{t-J},$$

where k=1, 2 or 3 and J=1 (i.e. one sampling time interval).

This defines three values constituting the delta amplitudes component of the analyser output at 60 in relation to the spectral cross-section $x_t$ input at time t. It provides for each delta amplitude for $x_t$ to be the difference between the associated formant amplitude values for the respective immediately succeeding and preceding cross-sections $x_{t+1}$ and $x_{t-1}$. Each delta amplitude is equivalent to the derivative with respect to time of the associated formant amplitude.

It is possible to use values other than J=1 in the determination of delta frequencies and amplitudes. Moreover these time derivatives may be computed using a more sophisticated method, such as finding the best linear fit over a time interval.

All five outputs from the formant analyser, that is to say formant frequencies, formant amplitudes, delta frequencies, delta amplitudes and confidence weights, are used in connection with speech processing for the deaf using the computer 25 and VDU 29, and for input to the HMM word matcher 24.

For each short-term spectral cross-section of an input speech signal, the present invention is intended to produce plausible formant labellings largely as would be provided by a human expert. It should only rarely give interpretations that would not be acceptable as plausible by such an expert.

It is possible to envisage providing formant labelling equivalent to that of a human expert by storing all significantly different spectral cross-sections that might arise, and to associate each of these with one or more formant labellings. For each input spectral pattern the stored pattern that was most similar would be identified together with the formant labelling associated therewith. Although this approach is the ideal, it is computationally very expensive and unlikely to be feasible in practice because a very large number of patterns would be needed. To achieve sufficiently accurate formant frequencies for all conceivable speech spectral cross-sections might require many tens of thousands of stored cross-sections. Comparing each input cross-section with each of these in turn to find the best match would be a very long computation, and storing comparison cross-sections would require a large amount of memory. Furthermore, the time needed to identify formant labels for so many patterns would be onerous.

The example described with reference to FIGS. 1 and 2 provides performance approaching that of the ideal mentioned above, but using a fairly small number of stored patterns. It selects those likely to be the most suitable of the available stored comparison patterns, and adjusts the formant frequencies of the selected pattern to allow for the differences of spectral shape between an input spectral cross-section and a comparison pattern. It is possible to use other methods of obtaining short-term speech spectra, such as by using a bank of band-pass filters.

The frequency resolution of a sixty-four point FFT is particularly suitable for the spectral analysis for the example described above. Against this, as has been said, it has the disadvantage that, particularly for low-pitched speech, each set of sixty-four consecutive samples of speech waveform sampled at 8 kHz may lie between two points of excitation of the vocal tract. To avoid this difficulty the system 10 uses transforms taken from time regions beginning with a point of excitation, with special provision of repeating an excitation point for frames where there is no excitation point because the speech is of very low pitch. Alternatively, one may take several successive sixty-four point transforms displaced slightly in time and to combine their results to get a single spectral cross-section. A further alternative is to use longer Fourier transforms, of duration perhaps 20 or 30 ms, and to combine the outputs from adjacent frequencies to derive a more coarsely quantized spectral description. In the case of longer transforms and high-pitched speakers some combination in the frequency domain would in any case be necessary to avoid confusion between formants and harmonics of the fundamental frequency.

Even when the formant frequencies are quantized at 125 Hz intervals as in the example described above, the number of possible combinations of the frequencies of three formants will approach 1000. Further variation to deal with different formant amplitudes for each pattern of frequencies would give rise to many tens of thousands of patterns. Frequency warping a stored pattern to make its peak positions correspond with those of the input pattern as described in relation to FIG. 2, makes it possible to make a single stored pattern match fairly well to a substantial number of related input spectral cross-sections. Experiments have shown that any single formant in a stored pattern can cover a range of up to 750 Hz in formant frequency of an input cross-section. If this range is conservatively reduced to 500 Hz in the case of F1, an overall reduction in number of patterns needed for a 125 Hz frequency quantized system would then be 7×7×5. That is to say a reduction of number of stored patterns by a factor of 245 is achieved. This substantial reduction makes the system 10 a practical proposition.

Figure 8:
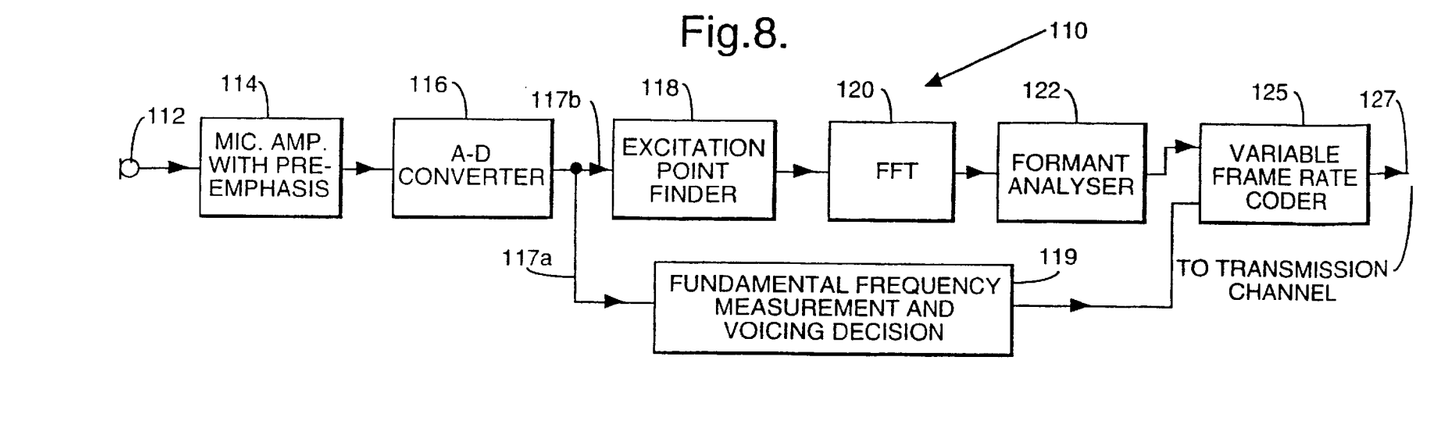
FIGS. 8 and 9 are schematic block diagrams collectively illustrating a speech processing system of the invention comprising a formant vocoder transmitter and receiver.

Referring now to FIG. 8, a transmitter 110 for a formant-based vocoder communications system is shown schematically. The system is similar to a prior art formant-based vocoder communications system, except that it incorporates formant analysis in accordance with the invention as described earlier. It will therefore only be described in outline. Parts equivalent to those described earlier are like-reference with a prefix 100. The output from a microphone 112 is fed to a pre-emphasis amplifier 114 and thence to an analogue-to-digital converter (ADC) 116. The output of the ADC is fed along two different paths 117a and 117b to an excitation point finder 118 and a fundamental frequency analyser 119 respectively. The fundamental frequency analyser 119 determines the nature of the spectral fine structure for every frame of input data. The fundamental frequency analyser 119 determines whether the current speech signal is voiced (i.e. the vocal folds are vibrating) or un-voiced (i.e. the vocal folds are not vibrating) and sets a switch accordingly. For voiced sounds the analyser also outputs the fundamental frequency of the glottal waveform, which is closely related to the perceived pitch of the voice.

The other path 117b from the ADC 116 is associated with determination of the properties of the short-term spectrum of input speech data for a regular sequence of frames. In the transmitter 110 the short-term spectral shape is determined in synchronism with the main points of excitation of the vocal tract, because this gives a more accurate representation of the vocal tract properties than measuring the average spectrum over a longer time window. The excitation point finder 118 detects regions of the speech waveform where the power has a local maximum, and for each frame passes these portions of waveform to a fast Fourier transformer (FFT) 120 which implements the fast Fourier transform algorithm. A formant analyser 122 measures the frequencies and amplitudes of the three lowest-frequency formants of the speech signal as described earlier with reference to FIGS. 1 and 2. The fundamental frequency analyser 119 and the formant analyser 122 both provide input to a variable frame rate coder 125, which provides a signal at an output 127 for transmission to a remote receiver via a transmission channel (not shown).

Variable frame rate coding is well known in the prior art. Its purpose is to provide further compression, or bit-rate reduction, by detecting regions of the speech signal over which the outputs of the formant analyser 122 and fundamental frequency analyser 119 change approximately linearly with time (i.e. in the sense that the sum of the Euclidean distances between values of these parameters in the region and their best straight line approximation over the region is less than a pre-set threshold T). In this case the actual sequence of outputs of the formant analyser and the fundamental frequency analyser 119 are replaced by the parameters of their straight line approximations over the region and the length of the region (in terms of number of frames). For example, if the number of parameters at each time is fifteen (average values and line slopes for three formant frequencies and amplitudes, average value and line slope for the fundamental frequency of voicing, and one excitation source flag) and the region length L is ten, then the number of parameters which must be encoded is reduced from eighty to sixteen.

Figure 9:
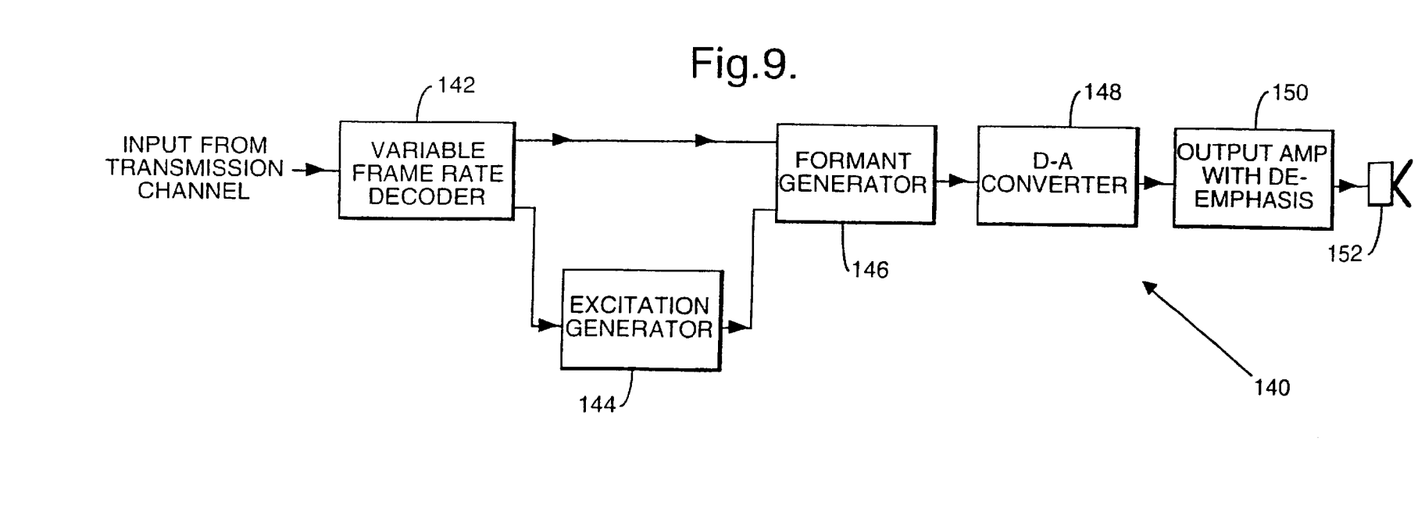

FIG. 9 shows a formant vocoder receiver 140, also known as a formant synthesiser, which is well known in the prior art. The transmission channel signal is converted to a fixed frame rate by a variable frame rate decoder 142, which replaces the parameters described above (formant frequencies and amplitudes, fundamental frequency, the rates of change of these seven quantities, one excitation source flag, one region length L) with a sequence of L sets of eight parameters, each set having the formant frequencies and amplitudes and fundamental frequency generated to vary linearly as specified by their corresponding straight line parameters, and the excitation source flag equal to the transmitted excitation source flag. The resulting output is supplied to an excitation generator 144 and to a formant generator 146. The excitation generator 144 generates one of two possible excitation waveforms. If the excitation source code for the current time indicates that the sound is voiced with a fundamental frequency of f Hz, then a representation of the glottis waveform with frequency f is generated. Otherwise, a noise signal is generated representing the type of noise produced when air passes through a constriction in the vocal tract. The formant generator 146 provides resonant frequencies and gains in response to the formant frequency and amplitude information supplied by the variable frame rate decoder 142 and the output of the excitation generator 144. It is a device which is of a kind which is well known in the prior art, and it employs a parallel connection of filters to generate a required spectral shape. The filter characteristics are determined by the formant frequencies and amplitudes. The signals from the formant generator 146 are fed to the digital-to-analogue converter 148, and thence to an output amplifier 150 arranged to counteract the input pre-emphasis applied at 114 in the transmitter 110. The final signal is then sent to an audio output transducer 152 to generate a speech output.

What is claimed is:

1. A speech signal processing system including spectral processing means (14, 16, 18, 20) for producing formant frequencies for spectral cross-sections of input speech signals, comprising:
   a) storing means (34) for storing comparison spectral cross-sections and formant frequencies associated with said comparison spectral cross-section; and
   b) comparing means (32, 36) for matching said stored comparison spectral cross-sections with said input speech signal spectral cross-sections and for providing stored formant frequencies associated with said comparison spectral cross-section in response to a match between said comparison spectral cross-section and said input speech signal spectral cross-section.

2. A system according to claim 1 wherein the formant frequencies associated with comparison spectral cross-sections are assigned thereto by a human expert.

3. A system according to claim 1 wherein the spectral processing means (14, 16, 18, 20) is arranged to produce spectral cross-sections from speech waveform samples which include periods immediately after main points of excitation of a speaker's vocal tract caused by vibrating vocal folds, or by air turbulence when the vocal folds are not vibrating.

4. A system according to claim 1 wherein the comparing means (32, 36) incorporates means (32) for selecting a sub-set of comparison spectral cross-sections for matching with each input speech signal spectral cross-section, the sub-set being those comparison spectral cross-sections which exhibit greater similarity to the respective input speech signal spectral cross-section than other stored but non-selected comparison spectral cross-sections when assessed on the basis of an error metric.

5. A system according to claim 1 wherein the comparing means (32, 36) incorporates warping means (36) for warping cross-sections to produce matching between comparison spectral cross-sections and input speech signal spectral cross-sections.

6. A system according to claim 5 wherein the comparing means (32, 36) is arranged to provide formant frequencies for an input speech signal spectral cross-section derived from those associated with a comparison spectral cross-section after transformation in accordance with the warping required to match the comparison spectral cross-section to the input speech signal spectral cross-section.

7. A system according to claim 5 wherein the warping means (36) is arranged to implement:
   a) a warping function with a slope in the range 0.5 to 2,
   b) a maximum frequency shift not exceeding ±375 Hz, and
   c) maximum frequency shift values in respect of a first formant frequency range comprising ±125 Hz below 500 Hz and ±250 Hz above 500 Hz but not above 1000 Hz.

8. A system according to claim 1, said system includes means (46) for determining formant amplitudes from the spectral cross-sections of input speech signals and the formant frequencies associated with comparison spectral cross-sections matched therewith.

9. A system according to claim 1 wherein at least one of the comparison spectral cross-sections in the storing means (34) is associated with at least two alternative sets of formant frequencies.

10. A system according to claim 9 wherein said system is arranged to select between alternative sets of formant frequencies on the basis of formant frequency continuity in the time domain.

11. A system according to claim 1 wherein said system includes means (22) for determining formant amplitudes for input speech signal spectral cross-sections together with speech recognition means (24) responsive to formant frequencies and formant amplitudes.

12. A system according to claim 11 wherein the speech recognition means (24) comprises Hidden Markov Model word matching means responsive to formant frequencies and formant amplitudes.

13. A system according to claim 1 wherein the spectral processing means (14, 16, 18, 20) is arranged to determine spectral cross-sections of input speech signals from the short-term spectral shapes thereof in synchronism with main points of excitation of a vocal tract associated therewith.

14. A method of processing speech comprising producing spectral cross-sections of input speech signals, characterised in that it includes the steps of:
   a) providing comparison spectral cross-sections and respective formant frequencies associated therewith; and
   b) matching comparison spectral cross-sections with input speech signal spectral cross-sections and providing formant frequencies derived from those associated with a comparison spectral cross-section in response to a match between that cross-section and an input speech signal spectral cross-section.

15. A method according to claim 14 characterised in that the formant frequencies associated with comparison spectral cross-sections are assigned thereto by a human expert.

16. A method according to claim 14 characterised in that the spectral cross-sections are produced from speech waveform samples which include periods immediately after main points of excitation of a speaker's vocal tract caused by vibrating vocal folds, or by air turbulence when the vocal folds are not vibrating.

17. A method according to claim 14, characterised in that matching in step (b) includes selecting a sub-set of comparison spectral cross-sections for matching with each input speech signal spectral cross-section, the sub-set being those comparison spectral cross-sections which exhibit greater similarity to the respective input speech signal spectral cross-section than other stored but non-selected comparison spectral cross-sections when assessed on the basis of an error metric.

18. A method according to claim 14, characterised in that matching in step (b) includes warping cross-sections to produce matching between comparison spectral cross-sections and input speech signal spectral cross-sections.

19. A method according to claim 18 characterised in that matching in step (b) includes providing formant frequencies for an input speech signal spectral cross-section derived from those associated with a comparison spectral cross-section after transformation in accordance with the warping required to match the comparison spectral cross-section to the input speech signal spectral cross-section.

20. A method according to claim 18 characterised in that warping involves:
   a) a warping function with a slope in the range 0.5 to 2,
   b) a maximum frequency shift not exceeding ±375 Hz, and
   c) maximum frequency shift values in respect of a first formant frequency range comprising ±125 Hz below 500 Hz and ±250 Hz above 500 Hz but not above 1000 Hz.

21. A method according to claim 14 characterised in that it includes determining formant amplitudes from the spectral cross-sections of input speech signals and the formant frequencies associated with comparison spectral cross-sections matched therewith.

22. A method according to claim 21 characterised in that it includes determining delta frequencies and delta amplitudes for input speech signal spectral cross-sections from the formant frequencies and formant amplitudes associated with preceding and succeeding input speech signal spectral cross-sections.

23. A method according to claim 14 characterised in that it includes refining estimates of formant frequencies on the basis of shapes of respective input spectral cross-sections in the regions of such frequencies.

24. A method according to claim 14 characterised in that it includes refining estimates of formant frequencies on the basis of effects attributable to neighbouring formants.

25. A method according to claim 14 characterised in that some of the comparison spectral cross-sections are associated with at least two alternative sets of formant frequencies.

26. A method according to claim 25 characterised in that it includes selection between alternative sets of formant frequencies on the basis of formant frequency continuity in the time domain.

27. A method according to claim 26 characterised in that it includes responding to an input speech signal of ambiguous nature by selecting a plurality of alternative sets of formant frequencies in accordance with degree of formant frequency continuity in the time domain.

28. A method according to claim 14 characterised in that it includes means (22) for determining formant amplitudes for input speech signal spectral cross-sections together with speech recognition means (24) responsive to formant frequencies and formant amplitudes.

29. A method according to claim 28 characterised in that it includes Hidden Markov Model word matching on the basis of formant frequencies and formant amplitudes.

30. A method according to claim 14 characterised in that it includes determining formant amplitudes for input speech signal spectral cross-sections together with displaying formant information from such cross-sections to enable comparison with reference information.

31. A method according to claim 14 characterised in that it includes generating confidence weights to indicate degree of confidence associated with formant information produced by the system.

32. A method according to claim 14 characterised in that it includes determining spectral cross-sections of input speech signals from the short-term spectral shapes thereof in synchronism with main points of excitation of a vocal tract associated therewith.

33. A method according to claim 32 characterised in that each short-term spectral shape is determined in a time interval of less than 10 ms.

34. A computer implemented speech signal processing system for producing formant frequencies for spectral cross-sections of input speech signals, said system comprising:
   a) a pattern store for storing comparison spectral cross-sections and formant frequencies associated with said comparison spectral cross-sections; and
   b) a comparator for comparing said input speech signal spectral cross-sections with said stored comparison spectral cross-sections and for providing, in response to a match between said stored comparison spectral cross-section and said input speech signal spectral cross-section, said stored formant frequencies associated with said comparison spectral cross-sections.

35. A system according to claim 34, wherein the formant frequencies associated with comparison spectral cross-sections are assigned thereto by a human expert.

36. A system according to claim 34, wherein the system includes a subroutine for producing spectral cross-sections from speech waveform samples which include periods immediately after main points of excitation of a speaker's vocal tract caused by vibrating vocal folds, or by air turbulence when the vocal folds are not vibrating.

37. A system according to claim 34, wherein the comparator is arranged to select a sub-set of comparison spectral cross-sections for matching with each input speech signal spectral cross-section, the sub-set being those comparison spectral cross-sections which exhibit greater similarity to the respective input speech signal spectral cross-section than other stored but non-selected comparison spectral cross-sections when assessed on the basis of an error metric.

38. A system according to claim 34, wherein the comparator is arranged to warp cross-sections to produce matching between comparison spectral cross-sections and input speech signal spectral cross-sections.

39. A system according to claim 38, wherein the comparator is arranged to provide formant frequencies for an input speech signal spectral cross-section derived from those associated with a comparison spectral cross-section after transformation in accordance with the warping required to match the comparison spectral cross-section to the input speech signal spectral cross-section.

40. A system according to claim 38, wherein the comparator is arranged to implement:
   c) a warping function with a slope in the range 0.5 to 2,
   d) a maximum frequency shift not exceeding ±375 Hz, and
   e) maximum frequency shift values in respect of a first formant frequency range comprising ±125 Hz below 500 Hz and ±250 Hz above 500 Hz but not above 1000 Hz.

41. A system according to claim 33, further including a measurement subroutine for determining formant amplitudes from the spectral cross-sections of input speech signals and the formant frequencies associated with comparison spectral cross-sections matched therewith.

42. A system according to claim 41, wherein said subroutine includes determining delta frequencies and delta amplitudes for input speech signal spectral cross-sections from the formant frequencies and formant amplitudes associated with preceding and succeeding input speech signal spectral cross-sections.

43. A system according to claim 34, further including a fine frequency adjuster for refining estimates of formant frequencies on the basis of shapes of respective input spectral cross-sections in the regions of such frequencies.

44. A system according to claim 34, further including a fine frequency adjuster for refining estimates of formant frequencies on the basis of effects attributable to neighbouring formants.

45. A system according to claim 34, wherein some of the comparison spectral cross-sections in the pattern store are associated with at least two alternative sets of formant frequencies.

46. A system according to claim 45, further including a selection subroutine to select between alternative sets of formant frequencies on the basis of formant frequency continuity in the time domain.

47. A system according to claim 46, wherein said selection subroutine is arranged to respond to an input speech signal of ambiguous nature by selecting a plurality of alternative sets of formant frequencies in accordance with degree of formant frequency continuity in the time domain.

48. A system according to claim 34, further including a formant analyser for determining formant amplitudes for input speech signal spectral cross-sections together with a word matcher responsive to formant frequencies and formant amplitudes.

49. A system according to claim 48, wherein the word matcher comprises a Hidden Markov Model word matcher responsive to formant frequencies and formant amplitudes.

50. A system according to claim 34, further including a formant analyser for determining formant amplitudes for input speech signal spectral cross-sections together with a visual display unit for display formant information from such cross-sections to enable comparison with reference information.

51. A system according to claim 34, further including a weight calculator for generating confidence weights to indicate degree of confidence associated with formant information produced by the system.

52. A system according to claim 34, including a spectral processor comprising a pre-emphasis amplifier, an analog-to-digital converter, an excitation point finder and a Fast Fourier Transformer, said processor arranged to determine spectral cross sections of input speech signals from the short-term spectral shapes thereof in synchronism with main points of excitation of a vocal tract associated therewith.

53. A system according to claim 52, wherein the spectral processor is arranged to determine a short-term spectral shape in a time interval of less than 10 ms.

* * * * *